United States Patent
Belakshe et al.

(10) Patent No.: US 11,084,971 B2
(45) Date of Patent: Aug. 10, 2021

(54) ACIDIZING TREATMENT FLUIDS FOR USE IN SUBTERRANEAN FORMATION OPERATIONS

(71) Applicant: Halliburton Energy Services, Inc., Houston, TX (US)

(72) Inventors: Ravikant S. Belakshe, Pune (IN); Monalisa Mallick, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 9 days.

(21) Appl. No.: 16/321,974

(22) PCT Filed: Sep. 6, 2016

(86) PCT No.: PCT/US2016/050371
§ 371 (c)(1),
(2) Date: Jan. 30, 2019

(87) PCT Pub. No.: WO2018/048383
PCT Pub. Date: Mar. 15, 2018

(65) Prior Publication Data
US 2019/0177601 A1    Jun. 13, 2019

(51) Int. Cl.
*C09K 8/528* (2006.01)
*C09K 8/532* (2006.01)

(52) U.S. Cl.
CPC .............. *C09K 8/532* (2013.01); *C09K 8/528* (2013.01); *C09K 2208/20* (2013.01)

(58) Field of Classification Search
CPC . C09K 8/72; C09K 8/584; C09K 8/74; C09K 2208/10; C09K 2208/32; C09K 8/602; C09K 8/70; C09K 2208/22; C09K 2208/26; C09K 8/03; C09K 8/12; C09K 8/14; C09K 8/524; C09K 8/528; C09K 8/54; C09K 8/58; C09K 8/588; C09K 8/60; C09K 8/605; C09K 8/607; C09K 8/62; C09K 8/685; C09K 8/703; C09K 8/725; C09K 8/80; C09K 8/845; C09K 8/86; C09K 8/88; C09K 8/887; C09K 8/94; C09K 8/532; C09K 2208/02
See application file for complete search history.

(56) References Cited

U.S. PATENT DOCUMENTS

| | | | |
|---|---|---|---|
| 3,669,613 A | 6/1972 | Knox et al. | |
| 4,888,121 A * | 12/1989 | Dill | C09K 8/528 507/241 |
| 6,436,880 B1 * | 8/2002 | Frenier | C09K 8/52 507/131 |
| 8,887,805 B2 | 11/2014 | Reyes | |
| 2005/0171234 A1 | 8/2005 | Blum | |
| 2005/0197257 A1 | 9/2005 | Bouwmeester | |
| 2010/0261623 A1 * | 10/2010 | Cassidy | C23F 11/04 507/243 |
| 2012/0260938 A1 | 10/2012 | Zack et al. | |
| 2013/0274155 A1 * | 10/2013 | Nasr-El-Din | C09K 8/54 507/241 |
| 2014/0287968 A1 | 9/2014 | Reyes et al. | |
| 2017/0198198 A1 * | 7/2017 | Mahmoud | E21B 37/06 |

FOREIGN PATENT DOCUMENTS

WO     2013189842     12/2013

OTHER PUBLICATIONS

Halliburton Product Data Sheet, downloaded on May 11, 2020.*
https://www.glossary.oilfield.slb.com/en/Terms/s/sulfide_scavenger. aspx downloaded on Oct. 8, 2020.*
Halliburton Product data Sheet SCA-130 downloaded on Oct. 9, 2020.*
https://en.wikipedia.org/wiki/ Hydrochloric _ acid downloaded on Oct. 9, 2020.*
https://en.wikipedia.org/wiki/Trisodium_ dicarboxymethyl _ alaninate downloaded on Oct. 9, 2020.*
International Search Report and Written Opinion for Application No. PCT/US2016/050371 dated Sep. 6, 2016.

* cited by examiner

*Primary Examiner* — Kumar R Bhushan
(74) *Attorney, Agent, or Firm* — Thomas Rooney; C. Tumey Law Group PLLC

(57) ABSTRACT

The present disclosure relates to acidizing treatment fluids for use in subterranean formation, such as wellbore, operations for dissolving iron sulfide scale, such as iron sulfide scale in sour conditions. Such treatment fluids comprise an aqueous base fluid; an acid; a chelating agent of methylglycine diacetic acid trisodium salt; and a hydrogen sulfide scavenger blend comprising 3-hydroxybutanal, crotonaldehyde, acetaldehyde, and a solvent base fluid.

17 Claims, 2 Drawing Sheets

ACIDIZING TREATMENT FLUIDS FOR USE IN SUBTERRANEAN FORMATION OPERATIONS

BACKGROUND

The present disclosure relates to acidizing treatment fluids for use in subterranean formation operations for dissolving iron sulfide scale, such as iron sulfide scale in sour conditions.

Acidic fluids may be present in a multitude of operations in the oil and chemical industries. For example, acidic fluids are often used as a treatment fluid in wellbores (or simply "wells") penetrating subterranean formations. Such acidic treatment fluids may be used in, for example, clean-up operations or stimulation operations for oil and gas wells. Acidic stimulation operations may use these treatment fluids in hydraulic fracturing, matrix acidizing treatments, and scale removal treatments. As used herein, the term "treatment fluid" refers to any fluid that may be used in an application in conjunction with a desired function and/or for a desired purpose. The term "treatment" does not imply any particular action by the fluid or any component thereof.

Acidizing and fracturing treatments using acidic treatment fluids commonly are carried out in hydrocarbon-containing subterranean formations penetrated by a well bore to accomplish a number of purposes, one of which is to increase the permeability of the formation. The increase in formation permeability normally results in an increase in the recovery of hydrocarbons therefrom. More particularly, the acidic treatment fluid reacts with acid-soluble materials contained in the formation, resulting in an increase in the size of the pore spaces and an increase in the permeability of the formation. In fracture-acidizing treatments, one or more fractures are produced or enhanced in the formation, and the acidic treatment fluid is introduced into the fracture to etch flow channels in the fracture face.

A common problem associated with using acidic treatment fluids in subterranean formations is the corrosion of the tubular goods in the well bore and the other equipment used to carry out the treatment. As used herein, the term "corrosion" refers to any reaction between a material and its environment that causes some deterioration of the material or its properties. Iron sulfide scale results as a byproduct of such corrosion and the buildup of such scale can coat perforations, casing, production tubulars, valves, pumps, and downhole completion equipment, such as safety equipment and gas lift mandrels, resulting in a decrease in hydrocarbon production. Indeed, if allowed to proceed, such scale buildup may eventually require abandonment of a well.

Corrosion and scale buildup are of particular concern in wellbores having sour conditions therein, characterized as having hydrogen sulfide ($H_2S$) present. Sour well environments are highly toxic and extremely corrosive to traditional carbon steel oil and gas alloys. To control such corrosion and scale buildup, traditional acidizing treatment fluids may include corrosion inhibitors, chelating agents, and/or sulfide scavengers for inhibiting the formation of iron sulfide scale within a subterranean formation. However, such additives are only effective at relatively low temperatures, even though many formation temperatures are much higher. More particularly, at temperatures greater than about 93.3° C. (equivalent to about 200° F.) such traditional treatment fluids may be ineffective or unreliable, resulting in severe corrosion as well as potential sulfide stress cracking.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
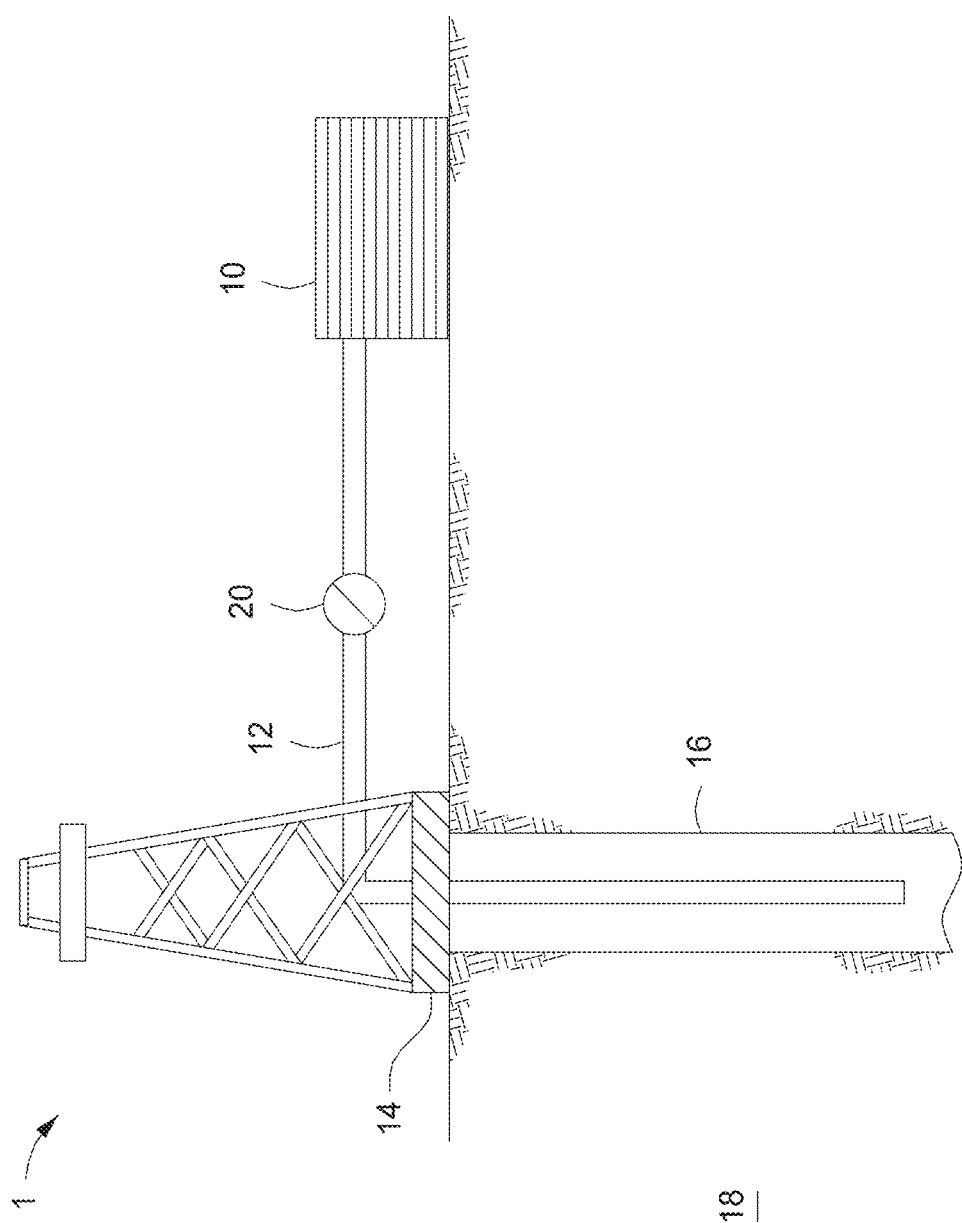
FIG. 1 depicts an embodiment of a system configured for delivering various treatment fluids of the embodiments described herein to a downhole location, according to one or more embodiments of the present disclosure.

The present disclosure relates to acidizing treatment fluids for use in subterranean formation operations for dissolving iron sulfide scale, such as iron sulfide scale in sour conditions.

The treatment fluids described herein are effective at a wide range of temperatures, including high temperature conditions, and do not inhibit iron sulfide scale formation in sour conditions, but instead dissolve iron sulfide scale present or being formed within a wellbore in a subterranean formation. More particularly, the treatment fluids described herein comprise a specific formulation for acidizing operations and dissolution of iron sulfide scale within a subterranean formation, including sour wells. Such sour wells typically cannot be acidized due to the presence of hydrogen sulfide resulting in severe iron sulfide scale formation upon reaction with an acid. However, the acidizing treatment fluids described herein are effective at dissolving such iron sulfide scale and thus allow acidizing treatments to be performed despite the sour conditions. Accordingly, the treatment fluids described herein bridge this gap and permit acidizing in sour wells.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 5," the range of 4.75 to 5.25 is encompassed. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

In some embodiments, the present disclosure provides a treatment fluid for use in dissolving iron sulfide scale, such as within a subterranean formation. As previously mentioned, the treatment fluids described herein are effective in sour environments and at high temperatures. However, the treatment fluids are also effective at low temperatures, thus allowing their use in a wide range of temperature conditions and subterranean formation types. For example, the treatment fluids described herein may be used effectively at temperatures (e.g., subterranean formation temperatures at a location of iron sulfide scale) in the range of about 50° C. to about 400° C., encompassing any value and subset therebetween. In other embodiments, the treatment fluids may be used effectively at temperatures in the range of about 82° C. to about 191° C., or temperatures greater than about 93.3° C. to about 400° C., encompassing any value and subset therebetween.

The treatment fluid of the present disclosure comprises an aqueous base fluid, an acid, a chelating agent of methylglycine diacetic acid trisodium salt ($Na_3MGDA$), and a hydrogen sulfide scavenger blend. The hydrogen sulfide scavenger blend comprises 3-hydroxybutanal, crotonaldehyde, acetaldehyde, and a solvent base fluid.

The aqueous base fluid included in the treatment fluids described herein may include any water-based fluid suitable for use in a subterranean formation and that is compatible with the remaining components of the treatment fluid. Suitable aqueous base fluids may include, but are not limited to, fresh water (e.g., having less than 1 gram of dissolved solids, such as salt, per liter), saltwater (e.g., water containing one or more salts dissolved therein), brine (e.g., having a higher concentration of salt than saltwater), seawater, wastewater (treated or untreated), produced water (treated or untreated water produced from a subterranean formation), and any combination thereof. In some preferred embodiments, the aqueous base fluid is fresh water. Optimization of the chelating agent may be used when selection of highly saline aqueous base fluids are selected for forming the treatment fluids described herein to optimize functionality of the treatment fluid as a whole, for example.

The acid included in the treatment fluids of the present disclosure serves to acidize a subterranean formation as described above and that is compatible with the remaining components of the treatment fluid. Additionally, the acid decreases the pH of the treatment fluid, and decreases the pH of the chelating agent of $Na_3MGDA$ (or additional chelating agents) which is highly basic. Any acid suitable for use in a subterranean formation may be used in accordance with the embodiments described herein. Examples of suitable acids for use in forming the treatment fluids described herein may include, but are not limited to, hydrochloric acid, formic acid, acetic acid, and any combination thereof. In some preferred embodiments, the selected acid is hydrochloric acid. The acid may be included in the treatment fluid such that the treatment fluid has a pH in the range of pH 0 to pH 4, encompassing any value and subset therebetween. In some preferred embodiments, the acid is included in the treatment fluid to achieve a pH of about 2.

In some embodiments, the amount of acid included in the treatment fluid is in an amount of from about 1% to about 10% by volume per volume of the liquid portion of the treatment fluid as a whole, encompassing any value and subset therebetween. The amount of acid is thus dependent on reaching the desired pH of the treatment fluid. In some embodiments, the acid is in an acid solution having an aqueous base fluid, as described above, and the acid is present in an amount of from about 32% to about 35%, encompassing any value and subset therebetween. Accordingly, the concentration of acid solution is included in the treatment fluid to achieve the desired pH, which may result in a total acid concentration of about 1% to about 10% by volume per volume of the liquid portion of the treatment fluid as a whole, encompassing any value and subset therebetween, as previously described.

As described above, the treatment fluids of the present disclosure comprise at least a chelating agent of $Na_3MGDA$, although additional chelating agents may be included, as described below. $Na_3MGDA$ is a member of family of salts of aminopolycarboxylic acid, and a non-limiting mechanism of action of the $Na_3MGDA$ in combination with the hydrogen sulfide scavenger for dissolving iron sulfide scale is described below. Accordingly, the combination of the $Na_3MGDA$, alone or in combination with other chelating agents, and the hydrogen sulfide scavenger blend allows the dissolution of iron sulfide scale within a formation, and in particular under sour conditions. The $Na_3MGDA$ selected for use as the primary (or only) chelating agent described herein is due to a number of factors including, but not limited to, its chelating complex stability constant of various metals, which is significantly higher in comparison to many other chelating agents. For example, the stability constant of $Fe(II)$ and $Fe(III)$ for $Na_3MGDA$ is 8.1 and 16.5, respectively. Moreover, the biodegradability of $Na_3MGDA$ is more effective than many other chelating agents.

The concentration of $Na_3MGDA$ accordingly may be dependent on a number of factors, such as the condition of the formation (e.g., the amount of iron sulfide scale to be dissolved), and the end goal of the particular operation being performed (e.g., scale removal, pickling, matrix acidizing, and the like). In some embodiments, the chelating agent of $Na_3MGDA$ is included in the treatment fluids of the present disclosure in an amount of from about 5% to about 25% by volume per volume of the liquid portion of the treatment fluid as a whole, encompassing any value and subset therebetween. In some embodiments, the Na$_3$MGDA is in a chelating solution of having an aqueous base fluid, as described above, and the Na$_3$MGDA is present in an amount of about 40%. Accordingly, the concentration of chelating solution is included in the treatment fluid to achieve the desired concentration of total Na$_3$MGDA in the range of about 5% to about 25% by volume per volume of the liquid portion of the treatment fluid as a whole, encompassing any value and subset therebetween, as previously described.

In some embodiments, the treatment fluids described herein include additional, or supplemental, chelating agent in addition to the Na$_3$MGDA, without departing from the scope of the present disclosure. Any chelating agent suitable for use in a subterranean formation and that is compatible with the remaining components of the treatment fluids described herein may be used in accordance with the embodiments of the present disclosure. The additional chelating agent may serve to boost the action or functionality of the Na$_3$MGDA and/or the hydrogen sulfide scavenger blend, or boost the iron chelation capacity of the treatment fluid as a whole, for example.

Examples of suitable additional chelating agents may include, but are not limited to, phosphate-based chelating agents; phosphonate-based chelating agents; ethylenediaminetetraacetic acid (EDTA); propylenediaminetetraacetic acid (PDTA); nitrilotriacetic acid (NTA); N-(2-Hydroxyethyl)ethylenediamine-N,N',N'-triacetic acid trisodium salt (HEDTA); diethylenetriaminepentaacetic acid (DTPA); hydroxyethyliminodiacetic acid (HEIDA); cyclohexylenediaminetetraacetic acid (CDTA); diphenylaminesulfonic acid (DPAS); ethylenediamined(o-hydroxyphenylacetic) acid (EDDHA); glucoheptonic acid; gluconic acid; citric acid; glutamic acid diacetic acid (GLDA); β-alanine diacetic acid (β-ADA); ethylenediaminedisuccinic acid; S,S-ethylenediaminedisuccinic acid (EDDS); iminodisuccinic acid (IDS); hydroxyiminodisuccinic acid (HIDS); polyamino disuccinic acids; N-bis[2-(1,2-dicarboxyethoxy)ethyl]glycine (BCA6); N-bis[2-(1,2-dicarboxyethoxy)ethyl]aspartic acid (BCA5); N-bis[2-(1,2-dicarboxyethoxy)ethyl]methylglycine (MCBA5); N-tris[(1,2-dicarboxyethoxy)ethyl]amine (TCA6); N-methyliminodiacetic acid (MIDA); minodiacetic acid (IDA); N-(2-acetamido)iminodiacetic acid (ADA); hydroxymethyl-iminodiacetic acid; 2-(2-carboxyethylamino) succinic acid (CEAA); 2-(2-carboxymethylamino) succinic acid (CMAA); diethylenetriamine-N,N'''-disuccinic acid; triethylenetetramine-N,N'''-disuccinic acid; 1,6-hexamethylenediamine-N,N'-disuccinic acid; tetraethylenepentamine-N,N''''-disuccinic acid; 2-hydroxypropylene-1,3-diamine-N,N'-disuccinic acid; 1,2-propylenediamine-N,N'-disuccinic acid; 1,3-propylenediamine-N,N'-disuccinic acid; cis-cyclohexanediamine-N,N'-disuccinic acid; trans-cyclohexanediamine-N,N'-disuccinic acid; ethylenebis(oxyethylenenitrilo)-N,N'-disuccinic acid; glucoheptanoic acid; cysteic acid-N,N-diacetic acid; cysteic acid-N-monoacetic acid; alanine-N-monoacetic acid; N-(3-hydroxysuccinyl) aspartic acid; N-[2-(3-hydroxysuccinyl)]-L-serine; aspartic acid-N,N-diacetic acid; aspartic acid-N-monoacetic acid; any salt thereof; any derivative thereof; and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Examples of suitable phosphate-based and phosphonate-based chelating agents may include, but are not limited to, aminomethylphosphonic acid (AMPA), dimethyl methylphosphonate (DMMP), 1-hydroxyethylidene-1,1-diphosphonic acid (HEDP), aminotris(methylenephosphonic acid) (ATMP), Ethylenediaminetetra(methylenephosphonic acid) (EDTMP), Tetramethylenediaminetetra(methylenephosphonic acid) (TDTMP), Hexamethylenediaminetetra (methylenephosphonic acid) (HDTMP), Diethylenetriaminepenta (methylenephosphonic acid) (DTPMP), Phosphonobutanetricarboxylic acid (PBTC), N-(phosphonomethyl) iminodiacetic acid (PMIDA), 2-carboxyethyl phosphonic acid (CEPA), 2-Hydroxyphosphonocarboxylic acid (HPAA), Aminotris (methylenephosphonic acid) (AMP), N,N-Bis (phosphonomethyl)glycine (BPMG), any salt thereof, any derivative thereof, and any combination thereof.

When additional chelating agents are included in the treatment fluids described herein, the total concentration of chelating agent, including the Na$_3$MGDA, may be in the range of about 5% to about 30% by volume per volume of the liquid portion of the treatment fluid as a whole, encompassing any value and subset therebetween. In any event, the amount of Na$_3$MGDA, as described above, is included in the treatment fluid in an amount in the range of about 5% to about 25% by volume per volume of the liquid portion of the treatment fluid as a whole, encompassing any value and subset therebetween. In any event, the total amount of Na$_3$MGDA and additional chelating agents does not exceed 25% by volume per volume of the liquid portion of the treatment fluid as a whole.

The hydrogen sulfide scavenger blend included in the treatment fluid of the present disclosure comprises 3-hydroxybutanal, crotonaldehyde, acetaldehyde, and a solvent base fluid. The hydrogen sulfide scavenger blend may be referred to herein simply as "the blend." The blend not only acts as a hydrogen sulfide scavenger for dissolution of iron sulfide scale, but also as a sulfide-crack inhibitor. That is, the blend aids in minimizing hydrogen sulfide cracking of high strength steels often used in equipment or components in subterranean formation operations. Without limitation, it is believed that the blend operates as a sulfide-crack inhibitor by first reacting with (or "scavenging") hydrogen sulfide and forming a coating compound that protects the metal equipment and/or component. The blend further enhances the performance of corrosion inhibitors when included in the treatment fluids described herein, including in the presence of sour environments.

As a total blend, the hydrogen sulfide scavenger blend described herein may be present in the treatment fluids of the present disclosure in an amount of from about 1% to about 6% by volume per volume of the liquid portion of the treatment fluid as a whole, encompassing any value and subset therebetween. In some preferred embodiments, the total blend of hydrogen sulfide scavenger blend is included in the treatment fluids described herein in the amount of from about 2% to about 6% by volume per volume of the liquid portion of the treatment fluid as a whole, encompassing any value and subset therebetween.

In some embodiments, the 3-hydroxybutanal may be present in an amount of from about 0.6% to about 4% by volume per volume of the liquid portion of the treatment fluid as a whole, the crotonaldehyde may be present in an amount of from about 0.05% to about 0.5% by volume per volume of the liquid portion of the treatment fluid as a whole, the acetaldehyde may be present in an amount of from about 0.05% to about 0.5% by volume per volume of the liquid portion of the treatment fluid as a whole, and the solvent base fluid may be present in an amount of from about 0.3% to about 1.8% by volume per volume of the liquid portion of the treatment fluid as a whole, encompassing any value and subset therebetween.

More particularly, in some embodiments, the 3-hydroxybutanal is present in an amount of about 50% to about 70% by volume per volume of the hydrogen sulfide scavenger blend, the crotonaldehyde is present in an amount of about 5% to about 7% by volume per volume of the hydrogen sulfide scavenger blend, the acetaldehyde is present in an amount of about 5% to about 7% by volume per volume of the hydrogen sulfide scavenger blend, and the solvent base fluid is present by volume per volume of the hydrogen sulfide scavenger blend to balance (i.e., to reach 100%). In some preferred embodiments, the 3-hydroxybutanal is present in an amount of about 60% by volume per volume of the hydrogen sulfide scavenger blend, the crotonaldehyde is present in an amount of about 5% by volume per volume of the hydrogen sulfide scavenger blend, the acetaldehyde is present in an amount of about 5% by volume per volume of the hydrogen sulfide scavenger blend, and the solvent base fluid is present by volume per volume of the hydrogen sulfide scavenger blend to balance.

Any solvent suitable for use in a subterranean formation and compatible with the remaining components of the blend and the treatment fluid may be used in accordance with the embodiments of the present disclosure. Examples of suitable solvents may include, but are not limited to, isopropyl alcohol, ethanol, ethylene glycol monobutyl ether (EGMBE), and any combination thereof.

The following mechanisms represent a non-limiting mechanism of action for the treatment fluids described herein. First, chelation of iron from iron sulfide occurs in the presence of the $Na_3MGDA$ (Mechanism 1); second, acid catalyzed dehydration of the 3-hydroxybutanal in the low pH of the treatment fluid occurs to form $\alpha,\beta$-unsaturated aldehyde (Mechanism 2); lastly, the reaction product of $\alpha,\beta$-unsaturated aldehyde reacts with hydrogen sulfide to dissolve iron sulfide scale and additionally provide sulfide-crack inhibition by effectively coating metal (Mechanism 3). As further explanation, acid catalyzed dehydration of the 3-hydroxybutanal produces $\alpha,\beta$-unsaturated aldehyde in situ. Moreover, the crotonaldehyde included in the blend is itself a $\alpha,\beta$-unsaturated aldehyde. The $\alpha,\beta$-unsaturated aldehyde scavenges hydrogen sulfide to dissolve iron sulfide scale. Where adol/3-hydroxybutanal and crotonaldehyde follow Mechanisms 2 and 3, acetaldehyde may react with hydrogen sulfide to form thioacetal for scavenging the iron sulfide scale described herein (Mechanism 4).

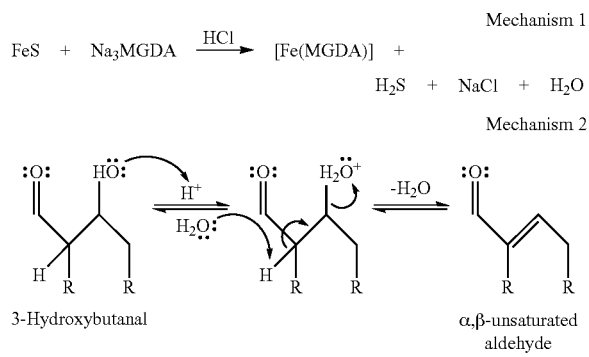

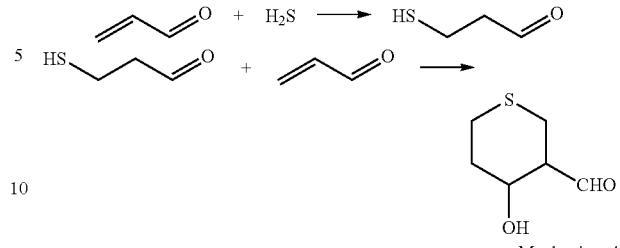

In some embodiments, the treatment fluids described herein may further include an additive such as, but not limited to, a salt, a weighting agent, an inert solid, a fluid loss control agent, an emulsifier, a non-emulsifier, a dispersion aid, a corrosion inhibitor, an emulsion thinner, an emulsion thickener, a viscosifying agent, a clay inhibitor, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, an anti-sludging agent (i.e., to prevent acid sludge formation (and may also act as a non-emulsifier)), a diversion material, and any combination thereof. In specific embodiments, the treatment fluids described herein include one or more of a corrosion inhibitor, a non-emulsifier, a clay inhibitor, and/or an anti-sludging agent.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering any one of the treatment fluids described herein, each treatment fluid is delivered separately into the subterranean formation, unless otherwise indicated.

The pump may be a high pressure pump in some embodiments. As used herein, the term "high pressure pump" will refer to a pump that is capable of delivering a treatment fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids (i.e., the HVFF, the LVPadF, the LVPropF) of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid or a portion thereof may, in some embodiments, flow back to wellhead 14 and exit subterranean formation 18. In some embodiments, the treatment fluid that has flowed back to wellhead 14 may subsequently be recovered and recirculated to subterranean formation 18, or otherwise treated for use in a subsequent subterranean operation or for use in another industry.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A: A treatment fluid for dissolving iron sulfide scale comprising: an aqueous base fluid; an acid; a chelating agent of methylglycine diacetic acid trisodium salt; and a hydrogen sulfide scavenger blend comprising 3-hydroxybutanal, crotonaldehyde, acetaldehyde, and a solvent base fluid.

Embodiment B: A method comprising: introducing a treatment fluid into a subterranean formation having iron sulfide scale therein, the treatment fluid comprising: an aqueous base fluid; an acid; a chelating agent of trisodium salt of methylglycine diacetic acid; and a hydrogen sulfide scavenger blend comprising 3-hydroxybutanal, crotonaldehyde, acetaldehyde, and a solvent base fluid; contacting the treatment fluid to the iron sulfide scale; and dissolving the iron sulfide scale.

Embodiment C: A system comprising: a tubular extending into the subterranean formation comprising iron sulfide scale therein; and a pump fluidly coupled to the tubular, the tubular containing a treatment fluid for dissolving iron sulfide scale comprising: an aqueous base fluid; an acid; a chelating agent of trisodium salt of methylglycine diacetic acid; and a hydrogen sulfide scavenger blend comprising 3-hydroxybutanal, crotonaldehyde, acetaldehyde, and a solvent base fluid.

Embodiments A, B, and C may have one or more of the following additional elements in any combination:

Element 1: Wherein when the treatment fluid is introduced into a subterranean formation comprising iron sulfide scale therein, the subterranean formation has a downhole temperature in the range of about 50° C. to about 400° C. at a location of the iron sulfide scale.

Element 2: Wherein the treatment fluid has a pH in the range of pH 0 to pH 4.

Element 3: Wherein the acid is present in the treatment fluid in an amount of from about 1% to about 10% by volume per volume of liquid portion of the treatment fluid.

Element 4: Wherein the chelating agent of methylglycine diacetic acid trisodium salt is present in the treatment fluid in an amount of from about 5% to about 25% by volume per volume of liquid portion of the treatment fluid.

Element 5: Wherein the hydrogen sulfide scavenger blend is present in the treatment fluid in an amount of from about 1% to about 6% by volume per volume of liquid portion of the treatment fluid.

Element 6: Wherein the 3-hydroxybutanal may be present in an amount of from about 0.6% to about 4% by volume per volume of liquid portion of the treatment fluid, the crotonaldehyde may be present in an amount of from about 0.05% to about 0.5% by volume per volume of liquid portion of the treatment fluid, the acetaldehyde may be present in an amount of from about 0.05% to about 0.5% by volume per volume of liquid portion of the treatment fluid, and the solvent base fluid may be present in an amount of from about 0.3% to about 1.8% by volume per volume of liquid portion of the treatment fluid.

Element 7: Wherein the 3-hydroxybutanal is present in an amount of about 50% to about 70% by volume per volume of the hydrogen sulfide scavenger blend, the crotonaldehyde is present in an amount of about 5% to about 7% by volume per volume of the hydrogen sulfide scavenger blend, the acetaldehyde is present in an amount of about 5% to about 7% by volume per volume of the hydrogen sulfide scavenger blend, and the solvent base fluid is present by volume per volume of the hydrogen sulfide scavenger blend to balance.

Element 8: Wherein the treatment fluid further comprises an additional chelating agent selected from the group consisting of phosphate-based chelating agents; phosphonate-based chelating agents; ethylenediaminetetraacetic acid (EDTA); propylenediaminetetraacetic acid (PDTA); nitrilotriacetic acid (NTA); N-(2-Hydroxyethyl)ethylenediamine-N,N',N'-triacetic acid trisodium salt (HEDTA); diethylenetriaminepentaacetic acid (DTPA); hydroxyethyliminodiacetic acid (HEIDA); cyclohexylenediaminetetraacetic acid (CDTA); diphenylaminesulfonic acid (DPAS); ethylenediaminedi(o-hydroxyphenylacetic) acid (EDDHA); glucoheptonic acid; gluconic acid; citric acid; glutamic acid diacetic acid (GLDA); β-alanine diacetic acid (β-ADA); ethylenediaminedisuccinic acid; S,S-ethylenediaminedisuccinic acid (EDDS); iminodisuccinic acid (IDS); hydroxyiminodisuccinic acid (HIDS); polyamino disuccinic acids; N-bis[2-(1,2-dicarboxyethoxy)ethyl]glycine (BCA6); N-bis[2-(1,2-dicarboxyethoxy)ethyl]aspartic acid (BCA5); N-bis[2-(1,2-dicarboxyethoxy)ethyl]methylglycine (MCBA5); N-tris[(1,2-dicarboxyethoxy)ethyl]amine (TCA6); N-methyliminodiacetic acid (MIDA); iminodiacetic acid (IDA); N-(2-acetamido)iminodiacetic acid (ADA); hydroxymethyl-iminodiacetic acid; 2-(2-carboxyethylamino) succinic acid (CEAA); 2-(2-carboxymethylamino) succinic acid (CMAA); diethylenetriamine-N,N''-disuccinic acid; triethylenetetramine-N,N'''-disuccinic acid; 1,6-hexamethylenediamine-N,N'-disuccinic acid; tetraethylenepentamine-N,N''''-disuccinic acid; 2-hydroxypropylene-1,3-diamine-N,N'-disuccinic acid; 1,2-propylenediamine-N,N'-disuccinic acid; 1,3-propylenediamine-N,N'-disuccinic acid; cis-cyclohexanediamine-N,N'-disuccinic acid; trans-cyclohexanediamine-N,N'-disuccinic acid; ethylenebis(oxyethylenenitrilo)-N,N'-disuccinic acid; glucoheptanoic acid; cysteic acid-N,N-diacetic acid; cysteic acid-N-monoacetic acid; alanine-N-monoacetic acid; N-(3-hydroxysuccinyl) aspartic acid; N-[2-(3-hydroxysuccinyl)]-L-serine; aspartic acid-N,N-diacetic acid; aspartic acid-N-monoacetic acid; any salt thereof; any derivative thereof; and any combination thereof.

By way of non-limiting example, exemplary combinations applicable to A, B, and C include: 1-8; 1, 3, and 6; 3 and 4; 6, 7, and 8; 2, 4, 5, and 7; 6 and 8; 1 and 5; and any combination of 1-8 without limitation.

To facilitate a better understanding of the embodiments of the present disclosure, the following examples of preferred or representative embodiments are given. In no way should the following examples be read to limit, or to define, the scope of the present disclosure.

EXAMPLE 1

In this example, a treatment fluid prepared according to one or more embodiments described herein was evaluated for its ability to dissolve iron sulfide, and in particular iron sulfide powder. A treatment fluid having a pH of 2 was prepared according to Table 1 with each component added in an amount of gallons per 1000 gallons (gal/Mgal). The total concentration by volume per volume in the treatment fluid is also provided in Table 1.

TABLE 1

| Component and Order of Addition | Amount (gal/Mgal) | Concentration (%) |
|---|---|---|
| Fresh Water | 567 | — |
| 35% HCl Solution (22° Be) | 104.5 | 4.2% |
| 40% Na$_3$MGDA Solution | 308.5 | 12.5% |
| Sulfide Scavenger Blend (60% 3-hydroxybutanal, 5% crotonaldehyde, 5% acetaldehyde, organic solvent to balance) | 20 | 2% |

A 100 milliliter (mL) volume of the treatment fluid of Table 1 was then exposed to 0.6295 grams (g) of iron sulfide powder, resulting in 4000 parts per million (ppm) of iron ions in the treatment fluid, for 12 hours at various temperatures. The amount of iron content spent was then measured using inductively couple plasma (mass spectrometry) analysis. The results are provided in Table 2 below.

TABLE 2

| Temperature | Iron Content Spent (ppm) | Iron Content Spent (%) |
|---|---|---|
| 180° F. | 1400 | 35% |
| 225° F. | 1534.8 | 38.37% |
| 275° F. | 2450 | 61.25% |
| 325° F. | 3073.6 | 76.84% |
| 375° F. | 3450 | 86.25% |

As shown in Table 2, the treatment fluid described herein effectively dissolved iron sulfide, and was more effective as the temperature increased. Moreover, the treatment fluids described herein do not require additional corrosion inhibitors (although such inhibitors may be included) to effectively dissolve iron sulfide, nor do they require metal reducing agents to aid in dissolution.

EXAMPLE 2

Figure 2:
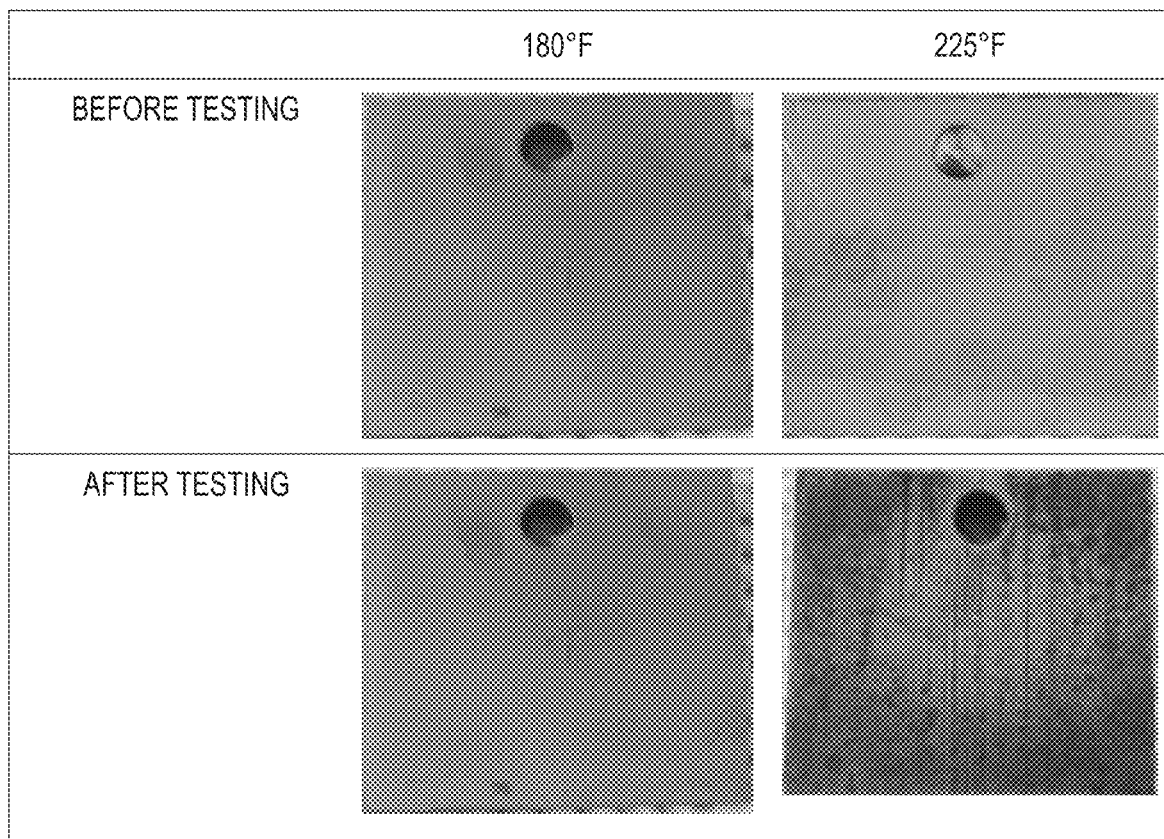
FIG. 2 visually depicts the negligible corrosion loss of metal in the presence of a treatment fluid prepared according to one or more embodiments of the present disclosure.

In this example, corrosion testing of iron sulfide powder in the presence of a treatment fluid prepared according to one or more embodiments described herein was evaluated. Corrosion testing was performed by placing iron sulfide powder at the bottom of a corrosion cell liner and pouring the treatment fluid of Table 1 (Example 1) in the liner. Tests were performed at two temperatures (180° F. and 225° F.) at a pressure of 1000 pounds per square inch (psi) for 12 hours. The corrosion loss was then evaluated using corrosion autoclaves, pressurized with 1000 psi of nitrogen pressure. Temperature is ramped up and stabilized with computer control. At 180° F., the corrosion loss was measured at 0.003 pounds per square foot (lb/ft$^2$); at 225° F., the corrosion loss was measured at 0.006 lb/ft². FIG. 2 shows the iron sulfide powder before and after testing. As shown in FIG. 2 and based on the measured corrosion loss, the treatment fluids described herein impart negligible corrosion to metal, such as metal equipment and components in a subterranean formation, even without a corrosion inhibitor and under such acidic conditions (pH 2).

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    introducing a treatment fluid into a subterranean formation having iron sulfide scale therein and hydrogen sulfide therein, the treatment fluid comprising:
        an aqueous base fluid;
        an acid;
        a chelating agent of trisodium salt of methylglycine diacetic acid; and
    a hydrogen sulfide scavenger blend comprising 3-hydroxybutanal, crotonaldehyde, acetaldehyde, and a solvent base fluid, wherein the hydrogen sulfide scavenger blend is present in an amount of about 62% by volume of the treatment fluid, wherein the 3-hydroxybutanal is present in an amount of about 50% to about 70% by volume per volume of the hydrogen sulfide scavenger blend, the crotonaldehyde is present in an amount of about 5% to about 7% by volume per volume of the hydrogen sulfide scavenger blend, the acetaldehyde is present in an amount of about 5% to about 7% by volume per volume of the hydrogen sulfide scavenger blend, and the solvent base fluid is present by volume per volume of the hydrogen sulfide scavenger blend to balance;
    contacting the treatment fluid to the iron sulfide scale; and
    dissolving the iron sulfide scale.

2. The method of claim 1, wherein the subterranean formation has a downhole temperature in the range of about 50° C. to about 400° C. at a location of the iron sulfide scale therein.

3. The method of claim 1, wherein the treatment fluid has a pH in the range of pH 0 to pH 4.

4. The method of claim 1, wherein the acid is present in the treatment fluid in an amount of from about 1% to about 10% volume per volume of liquid portion of the treatment fluid.

5. The method of claim 1, wherein the chelating agent of methylglycine diacetic acid trisodium salt is present in the treatment fluid in an amount of from about 5% to about 25% by volume per volume of liquid portion of the treatment fluid.

6. The method of claim 1, wherein the 3-hydroxybutanal may be present in an amount of from about 0.6% to about 4% by volume per volume of liquid portion of the treatment fluid, the crotonaldehyde may be present in an amount of from about 0.05% to about 0.5% by volume per volume of liquid portion of the treatment fluid, the acetaldehyde may be present in an amount of from about 0.05% to about 0.5% by volume per volume of liquid portion of the treatment fluid, and the solvent base fluid may be present in an amount of from about 0.3% to about 1.8% by volume per volume of liquid portion of the total treatment fluid.

7. The method of claim 1, wherein the treatment fluid further comprises an additional chelating agent selected from the group consisting of phosphate-based chelating agents; phosphonate-based chelating agents; ethylenediaminetetraacetic acid (EDTA); propylenediaminetetraacetic acid (PDTA); nitrilotriacetic acid (NTA); N-(2-Hydroxyethyl)ethylenediamine-N,N',N'-triacetic acid tri sodium salt (HEDTA); diethylenetriaminepentaacetic acid (DTPA); hydroxyethyliminodiacetic acid (HEIDA); cyclohexylenediaminetetraacetic acid (CDTA); diphenylaminesulfonic acid (DPAS); ethyl enedi amine di (o-hy droxyphenyl acetic) acid (EDDHA); glucoheptonic acid; gluconic acid; citric acid; glutamic acid diacetic acid (GLDA); β-alanine diacetic acid (β-ADA); ethylenediaminedisuccinic acid; S,S-ethylenediaminedisuccinic acid (EDDS); iminodisuccinic acid (IDS); hydroxyiminodisuccinic acid (HIDS); polyamino disuccinic acids; N-bis[2-(1,2-dicarboxyethoxy)ethyl]glycine (BCA6); N-bis[2-(1,2-dicarboxyethoxy)ethyl]aspartic acid (BCA5); N-bis[2-(1,2-dicarboxyethoxy)ethyl]methylglycine (MCBA5); N-tris[(1,2-dicarboxyethoxy)ethyl]amine (TCA6); N-methyliminodiacetic acid (MIDA); iminodiacetic acid (IDA); N-(2-acetamido)iminodiacetic acid (ADA); hydroxymethyl-iminodiacetic acid; 2-(2-carboxyethylamino) succinic acid (CEAA); 2-(2-carboxymethylamino) succinic acid (CMAA); diethylenetriamine-N,N"-disuccinic acid; triethylenetetramine-N,N""-disuccinic acid; 1,6-hexamethylenediamine-N,N'-disuccinic acid; tetraethylenepentamine-N,N""-disuccinic acid; 2-hydroxypropylene-1,3-diamine-N,N'-disuccinic acid; 1,2-propylenediamine-N,N'-disuccinic acid; 1,3-propylenediamine-N,N'-disuccinic acid; cis-cyclohexanediamine-N,N'-disuccinic acid; trans-cyclohexanediamine-N,N'-disuccinic acid; ethylenebis(oxyethylenenitrilo)-N,N'-disuccinic acid; glucoheptanoic acid; cysteic acid-N,N-diacetic acid; cysteic acid-N-monoacetic acid; alanine-N-monoacetic acid; N-(3-hydroxysuccinyl) aspartic acid; N-[2-(3-hydroxysuccinyl)]-L-serine; aspartic acid-N,N-diacetic acid; aspartic acid-N-monoacetic acid; any salt thereof; any derivative thereof; and any combination thereof.

8. The method of claim 1 wherein the acid is selected from the group consisting of hydrochloric acid, formic acid, acetic acid, and combinations thereof.

9. The method of claim 8 wherein the acid is included in the treatment fluid such the treatment fluid has a pH between 0-4.

10. A method comprising:
introducing into a wellbore a treatment fluid comprising:
an aqueous base fluid;
an acid;
a chelating agent of methylglycine diacetic acid trisodium salt; and
a hydrogen sulfide scavenger blend comprising 3-hydroxybutanal, crotonaldehyde, acetaldehyde, and a solvent base fluid, wherein the hydrogen sulfide scavenger blend is present in an amount of about 2% by volume of the treatment fluid, and wherein the 3-hydroxybutanal is present in an amount of about 50% to about 70% by volume per volume of the hydrogen sulfide scavenger blend, the crotonaldehyde is present in an amount of about 5% to about 7% by volume per volume of the hydrogen sulfide scavenger blend, the acetaldehyde is present in an amount of about 5% to about 7% by volume per volume of the hydrogen sulfide scavenger blend, and the solvent base fluid is present by volume per volume of the hydrogen sulfide scavenger blend to balance,
wherein the wellbore has a temperature of above 200 F and contains hydrogen sulfide.

11. The method of claim 10, wherein the treatment fluid has a pH in the range of pH 0 to pH 4.

12. The method of claim 10, wherein the acid is present in the treatment fluid in an amount of from about 1% to about 10% by volume per volume of liquid portion of the treatment fluid.

13. The method of claim 10, wherein the chelating agent of methylglycine diacetic acid trisodium salt is present in the treatment fluid in an amount of from about 5% to about 25% by volume per volume of liquid portion of the treatment fluid.

14. The method of claim 10, wherein the 3-hydroxybutanal may be present in an amount of from about 0.6% to about 4% by volume per volume of liquid portion of the treatment fluid, the crotonaldehyde may be present in an amount of from about 0.05% to about 0.5% by volume per volume of liquid portion of the treatment fluid, the acetaldehyde may be present in an amount of from about 0.05% to about 0.5% by volume per volume of liquid portion of the treatment fluid, and the solvent base fluid may be present in an amount of from about 0.3% to about 1.8% by volume per volume of liquid portion of the treatment fluid.

15. The method of claim 10, wherein the treatment fluid further comprises an additional chelating agent selected from the group consisting of phosphate-based chelating agents; phosphonate-based chelating agents; ethylenediaminetetraacetic acid (EDTA); propylenediaminetetraacetic acid (PDTA); nitrilotriacetic acid (NTA); N-(2-Hydroxyethyl)ethylenediamine-N,N',N'-triacetic acid trisodium salt (HEDTA); diethylenetriaminepentaacetic acid (DTPA); hydroxyethyliminodiacetic acid (HEIDA); cyclohexylenediaminetetraacetic acid (CDTA); diphenylaminesulfonic acid (DPAS); 1 ethylenediamindi(o-hydroxyphenylacetic) acid (EDDHA); glucoheptonic acid; gluconic acid; citric acid; glutamic acid diacetic acid (GLDA); β-alanine diacetic acid (β-ADA); 1 ethylenediaminedisuccinic acid; S,S-ethylenediaminedisuccinic acid (EDDS); iminodisuccinic acid (IDS); hydroxyiminodisuccinic acid (HIDS); polyamino disuccinic acids; N-bis[2-(1,2-dicarboxyethoxy)ethyl]glycine (BCA6); N-bis[2-(1,2-dicarboxyethoxy)ethyl]aspartic acid (BCA5); N-bis[2-(1,2-dicarboxyethoxy)ethyl]methylglycine (MCBA5); N-tris[(1,2-dicarboxyethoxy)ethyl]amine (TCA6); N-methyliminodiacetic acid (MIDA); iminodiacetic acid (IDA); N-(2-acetamido)iminodiacetic acid (ADA); hydroxymethyl-iminodiacetic acid; 2-(2-carboxyethylamino) succinic acid (CEAA); 2-(2-carboxymethylamino) succinic acid (CMAA); diethylenetriamine-N,N''-disuccinic acid; triethylenetetramine-N,N'''-disuccinic acid; 1,6-hexamethylenediamine-N,N'-disuccinic acid; tetraethylenepentamine-N,N''''-disuccinic acid; 2-hydroxypropylene-1,3-diamine-N,N'-disuccinic acid; 1,2-propylenediamine-N,N'-disuccinic acid; 1,3-propylenediamine-N,N'-disuccinic acid; cis-cyclohexanediamine-N,N'-disuccinic acid; trans-cyclohexanediamine-N,N'-disuccinic acid; ethylenebis(oxyethylenenitrilo)-N,N'-disuccinic acid; glucoheptanoic acid; cysteic acid-N,N-diacetic acid; cysteic acid-N-monoacetic acid; alanine-N-monoacetic acid; N-(3-hydroxysuccinyl) aspartic acid; N-[2-(3-hydroxysuccinyl)]-L-serine; aspartic acid-N,N-diacetic acid; aspartic acid-N-monoacetic acid; any salt thereof; any derivative thereof; and any combination thereof.

16. The method of claim 10 wherein the acid is selected from the group consisting of hydrochloric acid, formic acid, acetic acid, and combinations thereof.

17. The method of claim 1, wherein the treatment fluid further comprises at least one phosphonate-based chelating agent selected from the group consisting of aminomethylphosphonic acid (AMPA), dimethyl methylphosphonate (DMMP), 1-hydroxyethylidene-1,1-diphosphonic acid (HEDP), aminotris (methylenephosphonic acid) (ATMP), Ethylenediaminetetra (methylenephosphonic acid) (EDTMP), Tetramethylenediaminetetra (methylenephosphonic acid) (TDTMP), Hexamethylenediaminetetra (methylenephosphonic acid) (HDTMP), Diethylenetriaminepenta (methylenephosphonic acid) (DTPMP), Phosphonobutanetricarboxylic acid (PBTC), N-(phosphonomethyl) iminodiacetic acid (PMIDA), 2-carboxyethyl phosphonic acid (*CEPA*), 2-Hydroxyphosphonocarboxylic acid (HPAA), Aminotris (methylenephosphonic acid) (AMP), N,N-Bis (phosphonomethyl)glycine (BPMG), any salt thereof, any derivative thereof, and any combination thereof.

* * * * *

UNITED STATES PATENT AND TRADEMARK OFFICE
CERTIFICATE OF CORRECTION

PATENT NO. : 11,084,971 B2
APPLICATION NO. : 16/321974
DATED : August 10, 2021
INVENTOR(S) : Belakshe Page 1 of 1

It is certified that error appears in the above-identified patent and that said Letters Patent is hereby corrected as shown below:

In the Claims

Column 13, Line 54, Claim 1, delete "blend is present in an amount of about 62% by volume" and replace with --blend is present in an amount of about 2% by volume--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*